May 10, 1966 J. G. PEARCE 3,250,863

TEST ACCESS CIRCUIT

Filed June 4, 1962 2 Sheets-Sheet 1

INVENTOR.
JAMES G. PEARCE
BY
George W. Killin
AGENT

TEST ACCESS CIRCUIT

Filed June 4, 1962 2 Sheets-Sheet 2

United States Patent Office 3,250,863

Patented May 10, 1966

3,250,863

TEST ACCESS CIRCUIT

James G. Pearce, Webster, N.Y., assignor, by mesne assignments, to Stromberg-Carlson Corporation, Rochester, N.Y., a corporation of Delaware Filed June 4, 1962, Ser. No. 199,959

10 Claims. (Cl. 179—175.2)

This invention relates in general to time division multiplex systems and, more particularly, to means for selectively gaining access to lines connected to a time division multiplex system for the purpose of testing the characteristics of said lines.

Although the invention herein disclosed is suitable for more general application, it is particularly adapted for use in a time division multiplex telephone system. In time division multiplex telephone systems, as in any system wherein physical lines connect to the central office, or control equipment, it is desirable to be able to selectively and conveniently complete a metallic connection between any of the physical lines and common testing equipment. Once the metallic connection is completed to the line, various tests to determine line leaking resistance, the presence of foreign potentials or grounds, etc., may be made by use of testing circuits and equipment which are well known to those skilled in the art. Examples of testing circuits may be seen in the following United States patents: 2,806,093, issued on September 10, 1957, to W. W. Pharis; 2,852,626, issued September 16, 1958, to Frank Kessler; and 2,876,300, issued March 3, 1959, to W. W. Pharis. Each of these patents discloses testing circuits which may be used in step-by-step telephone offices wherein access to the individual lines to be tested may be obtained through the connector bank multiple. However, in a time division multiplex telephone system there are no step-by-step connectors and no connector bank multiple. Accordingly, the well known testing access circuits are not suitable for use in time division multiplex telephone systems.

Therefore, it is the general object of this invention to provide means for graining testing access to individual lines in a time divison multiplex system.

It is a more particular object of this invention to provide a new and improved means for selectively completing a metallic circuit to any one of the plurality of lines connecting to the central switching equipment.

It is another object of this invention to provide a new and improved means for selectively completing a metallic testing circuit to a predetermined one of a plurality of lines terminating at a time division multiplex switching center.

It is another object of this invention to provide a new and improved means for selectively connecting a testing circuit to any one of the lines connecting to a time division multiplex switching center.

It is another object of this invention to provide a new and improved means for connecting a testing circuit to a selected one of a predetermined group of lines without interfering with service to any of the other lines in said predetermined group.

Further objects and advantages of the invention will become apparent as the following description proceeds, and features of novelty which characterize the invention will be pointed out in particularity in the claims annexed to and forming a part of this specification.

The copending application of Brightman, Serial No. 45,342, filed July 26, 1960, and assigned to the same assignee as the prevent invention, discloses a time division multiplex communication system in which communication between line circuits and trunk circuits is carried on over a speech highway. All of the line circuits are connected to the speech highway and one data highway, while the trunk circuits are connected to the speech highway and to two separate one-way data highways. The system uses "floating" time slots that are assigned to calling circuits, and the calling and called circuits are connected to the speech and data highways under the control of delay lines which circulate calling and called circuit designations in the assigned time slot. The cited Brightman application discloses a means for sending a calling signal over the common communication channel. Since each station which is repetitively connected to the common channel is connected thereto for only a brief interval, it is not possible to pass sufficient power over the communication channel to operate conventional telephone type ringers. Accordingly, some electronic telephone communication systems employ a low power consumption signaling device which is conventionally referred to as a tone ringer.

The copending application of A. A. Jorgensen, Serial No. 90,412, filed February 20, 1961, and assigned to the same assignee as the present invention, discloses a time division multiplex telephone system in which the voice communication connections are completed in the same manner as that described in the cited Brightman application but in which the ringing signals are of the type conventionally used in standard telephone systems. That is, the cited Brightman patent teaches means for applying an A.C. ringing signal directly to the desired subscriber's line. The present invention is illustrated as it might be used in a time division multiplex telephone system such as that disclosed in the cited Jorgensen application. However, it should be understood that the present invention is not limited to such systems and could be used, for example, with the type of system disclosed in the cited Brightman application.

For a better understanding of the invention, reference may be had to the accompanying drawings which comprise two figures on two sheets. The two sheets of drawings should be arranged horizontally with FIG. 1 above FIG. 2.

FIGS. 1 and 2, taken together, disclose the invention in logic schematic form.

Logic schematic symbols are used rather than conventional circuit component symbols as it is believed that circuit details would only tend to mask or obscure the inventive principles.

For convenience, the elements of this invention which correspond closely with similar elements in the cited Brightman application have been given the same three-digit numerical designations which are employed therein, and the elements of this invention which correspond closely with similar elements in the cited Jorgensen application have been given the same two-digit numerical designations which are employed in the Jorgensen application; other components are assigned a four-digit identifying designation. For example, the bilateral voice gate 204, shown in the line circuit, corresponds directly with the bilateral voice gate shown in FIG. 2 of the referenced Brightman application. This gate may comprise a blocking oscillator gate of the type described in detail in the copending application of Pearce and Brightman, Serial No. 814,922, filed May 21, 1959, which copending application is assigned to the same assignee as the present invention. When a connection is established between a pair of lines, or a line and a trunk, the voice gates in the line circuit and trunk circuits are effective to connect components in these circuits so that bilateral speech transmission takes place by the use of the resonant energy transfer technique described in detail in Conference Paper No. 59–210 by J. C. Perkins, Jr., which was published in Communications and Electronics, January 1960, by The American Institute of Electrical Engineers, and which was entitled "Transmission Aspects of an Electronic Switchboard Employing Time Division Multiplexing." Data gate 208, which is included in line circuit 100, is effective to supply time slot pulses to the line data highway 112 under the control of dial impulses from conventional dialing devices, at the subscriber's telephone, and to control the selective application of time slot pulses to the highway 112 in accordance with the on-hook or off-hook condition of the line. Various suitable gate circuits for performing these operations are well known in the art. The gate circuit 208 is so arranged that an on-hook condition in the related station, or line circuit, permits the transmission of time slot pulses to the line data highway 112, while an off-hook condition suppresses the transmission of these pulses. Thus, the interruptions in the continuity of the line circuit due to dialing cause the transmission of bursts of time slot signals to the line data highway 112 in accordance with the dialed information.

As mentioned, logic symbols are used instead of detailed circuit drawings. It is believed that the use of logic symbols materially simplifies the drawings and facilitates the understanding of the underlying principles of the invention. The following logic symbols are used:

An OR gate is represented by a segment of a circle with one or more imput leads intersecting the cord and terminating at the arc, and with a single output lead from the arc portion of the segment. A typical circuit represented by this symbol is illustrated in FIG. 24B of the referenced Brightman application. The OR gate includes a plurality of diodes whose anodes are connected together to provide a single output terminal, while the cathodes provide a plurality of individual input terminals. A resistor, with one terminal thereof connected to the output terminal, provides an individual resistive input at the other terminal. When the input terminal of the resistor is connected to ground, or a relatively positive potential, the output of the gate will drop to a negative potential when the anode of one of the diodes is returned to a more negative potential. Thus, these OR gates provide an OR function for negative potentials.

An AND gate is represented by a symbol which differs from the OR gate symbol in that the input leads to an AND gate do not intersect the cord but terminate thereat. A typical circuit represented by this symbol is illustrated in FIG. 23B of the referenced Brightman application. The AND gate is similar in design to the OR gate except that the diodes are reversed in polarity. With the resistor input connected to a negative potential, the output of the gate will drop to a negative potential only when all of the individual input terminals are also connected to a negative potential. Thus, these AND gates provide an AND function for negative signals.

The circuit commonly known as a flip-flop circuit is represented by a rectangle comprising two squares side-by-side, one of which is shaded. The shaded side of the logic symbol for the flip-flop represents the side that is normally conducting and, at that time, the output lead from the shaded side of the long side of the rectangle is at a positive potential and the output lead from the unshaded side of the long side of the rectangle is at a negative potential. In response to the application of a positive signal to the input lead on the unshaded short side of the rectangle, the flip-flop circuit shifts to its other stable state and the potentials on the two output leads are reversed. In a similar manner, the flip-flop may be reset by an application of a positive potential to the input lead on the shaded short side of the rectangle. A flip-flop circuit is more properly known as an Eccles-Jordan circuit which is a direct-coupled multivibrator circuit with two conditions of stable equilibrium. A typical flip-flop circuit is illustrated in FIG. 27B of the cited Brightman application.

An inverter circuit is symbolically represented by a triangle with the input lead connected to the base and the output lead connected to the opposite apex, and with a line approximately the same length as the base drawn at right angles to and bisected by an imaginary altitude from the base. An inverter provides a positive output pulse in response to a negative input pulse. The circuits for typical pulse inverters are shown in FIGS. 25B and 26B of the cited Brightman application.

Those skilled in the art will recognize that the circuit details of each of the logic elements may take any of several possible forms and that other combinations of logic elements could be substituted for those illustrated. For example, a flip-flop might be replaced by a flip-flop element, thereby eliminating the need for the associated inverter in the set lead.

*General description*

In accordance with the illustrated embodiment of this invention, each line circuit is provided with an individual ringing relay which is effective to switch the subscriber's line wires from the time division multiplex switching circuits to the ringing generator circuit, as described in the cited Jorgensen application. In addition, for each of a predetermined group of lines, there is provided a common test control relay. A convenient arrangement is to use one test control relay for each group of ten lines wherein the ten lines have common tens and hundreds designations but different units designations. The line it is desired to test may be indicated by means of placing signals on the appropriate hundreds, tens, and units leads in response to a key, dial, or other appropriate operation. In response to the signals on the hundreds and tens leads, a test is made to determine if ringing current is being applied to any of the lines within the particular ten line group including the line to be tested. If no ringing is taking place or after ringing its tripped, if ringing had been taking place, the particular line it is desired to connect to the testing circuits is checked to determine if it is busy. If the line is busy, an appropriate lamp is illuminated to advise the testman of this condition. The testman may wait for the line to become idle and then proceed with testing, or he may override the busy condition by operation of a key at the test position. In either event, the line to be tested is switched through to the testing position on a metallic basis, thereby permitting the testman to make any appropriate tests, such as line leakage resistance, foreign potential tests, or shorts, etc.

Inasmuch as the group of lines, including the line being tested, employs a common ring trip relay, it will be necessary to interrupt the tests in the event that a call is directed to any of the other lines in the group. The line being tested was marked as busy when it was seized by the testing position circuit and, therefore, during the test, no calls will be forwarded to that line. The requirement for ringing on any of the other lines will cause the test control relay to be released and an appropriate lamp will be illuminated at the testing position circuit to give the testman supervision. Studies have shown that when tests are not made during the busy hour, the possibility of interruption of the test for five-minute, ten-minute, and thirty-minute intervals in any group of ten lines is .0067, .0135, and 0.404, respectively. Therefore, it is believed that the number of test interruptions will not materially handicap the testman in performing his functions.

When a test is interrupted in order to permit ringing on one of the other lines within the group, the line to be tested will be automatically reconnected to the testing position after ringing has been tripped and the test interrupt lamp will be extinguished, thereby advising the testman that he may proceed.

When the desired tests have been completed, operation of the test release key and the restoration of all other keys to their normal position will restore the access circuit to normal.

*Detailed description*

Figure 1:
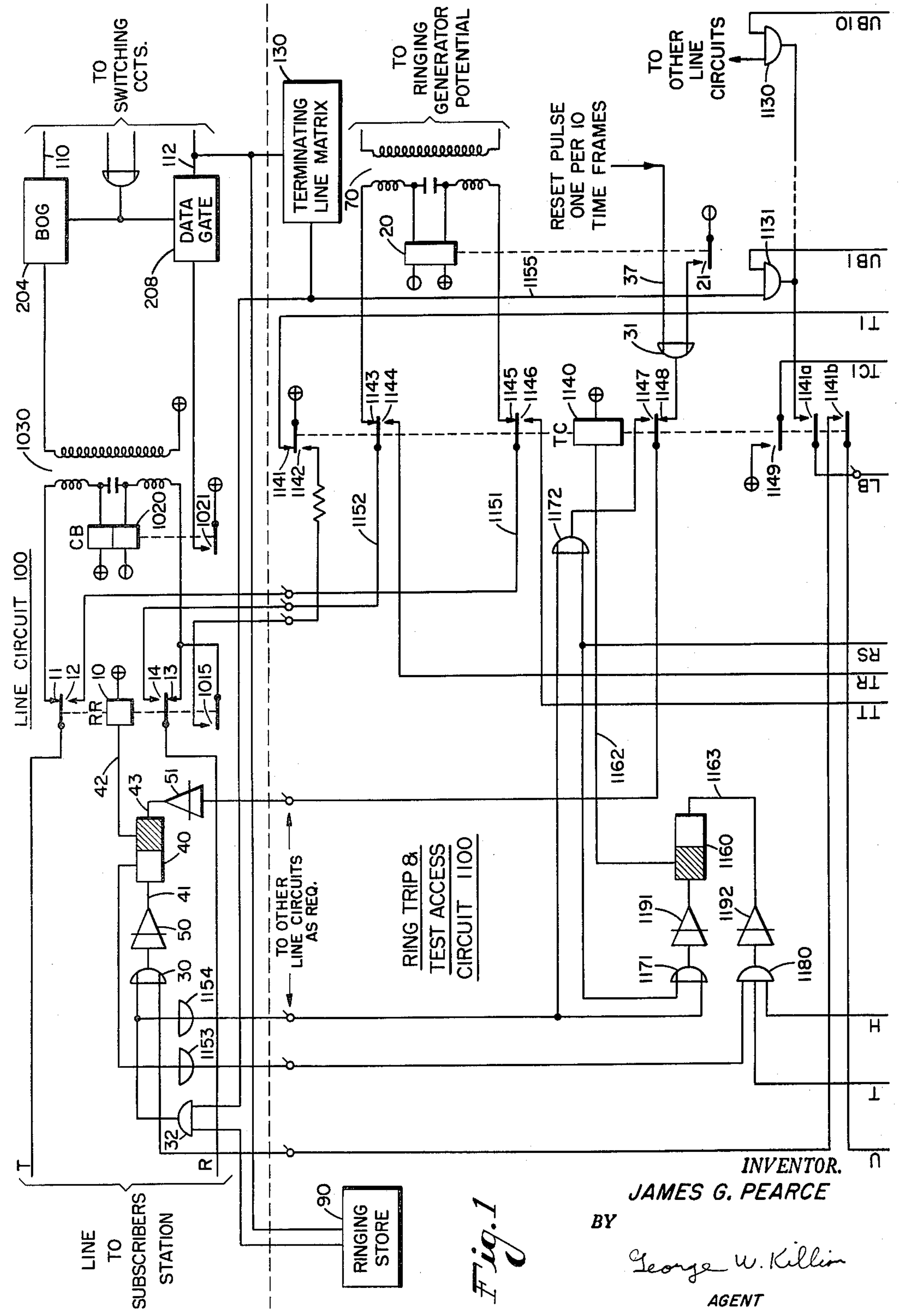
Figure 2:
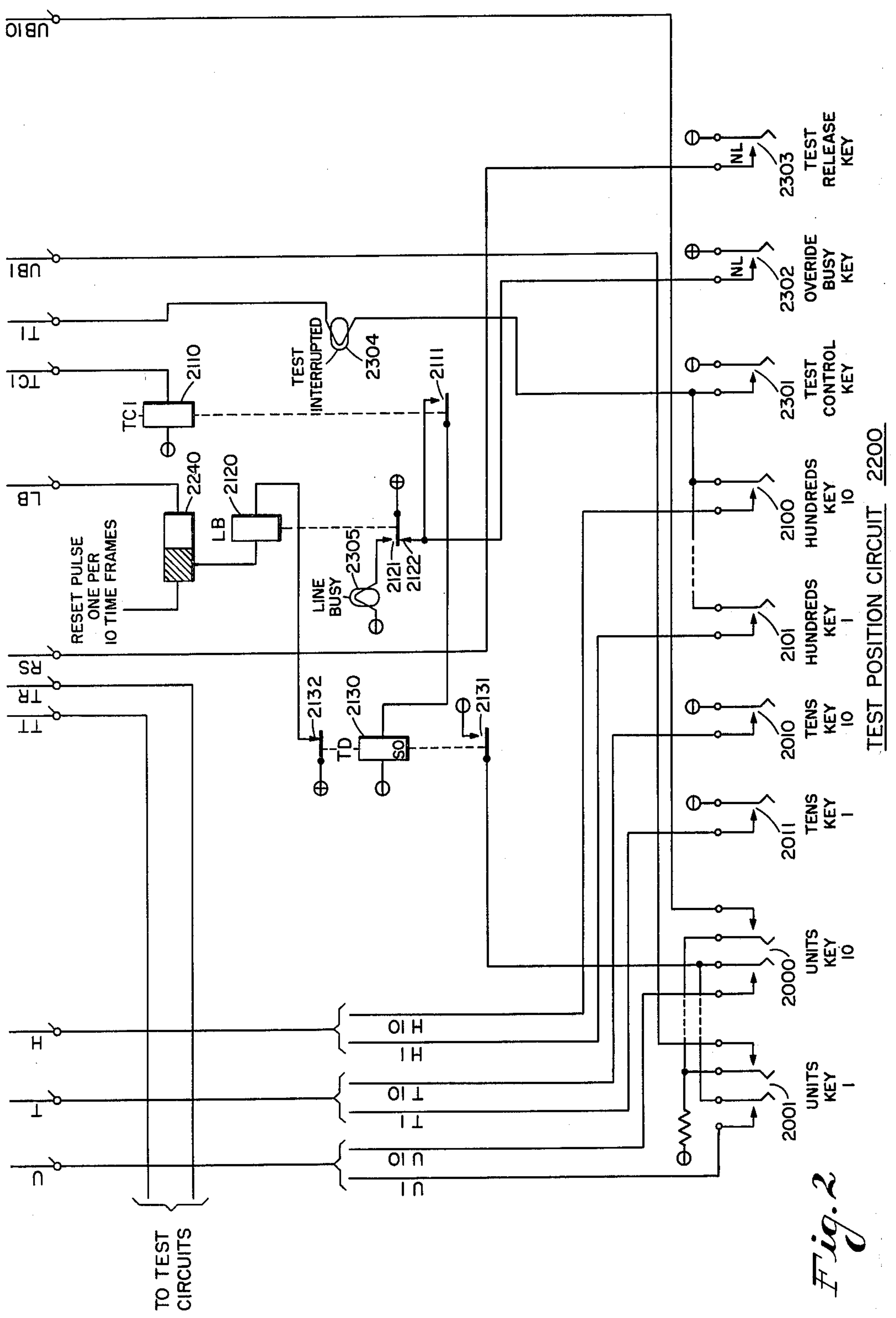

It is believed that the following detailed description of one embodiment of the invention taken together with the accompanying drawings will fully explain the remaining features and operation of this invention.

A system incorporating this invention may include a plurality of line circuits, such as line circuit 100. Each line circuit 100 includes a blocking oscillator gate 204 and a data gate 208 which are coupled to the speech highway 110 and the line data highway 112, respectively, and which function in the manner fully explained in the copending cited Brightman application. Inasmuch as the detailed operation of these circuits does not form an integral part of this invention, the detailed operation of these components is not described herein. In addition, each line circuit 100 includes a calling bridge relay 1020 and a ringing relay 10. Talking current for the subscriber's telephone (not shown), bridged across the line circuit conductors designated T and R, flows from the positive D.C. battery potential, designated (+) and hereinafter referred to as "ground" in accordance with standard telephone terminology, the upper winding on relay 1020, the upper left-half of repeat coil 1030, closed contacts 11, the line loop and the subscriber's telephone, closed contacts 13, the lower left-half of the repeat coil 1030 and the lower winding on relay 1020 to the negative D.C. battery potential, designated (−) and hereinafter referred to as "battery." Relay 1020 responds to off- and on-hook supervision and dial pulses from the subscriber's telephone instrument, and contacts 1021, asciated with relay 1020, repeat this information to the data gate 208 which applies time slot pulses to the line data highway 112 in the manner more fully set forth in the cited Brightman application. The ringing relay 10 is operated when lead 42 is switched to a negative potential in response to flip-flop 40 being set by a positive pulse on lead 41. The flip-flop 40 is normally in its reset state since reset pulses are applied to lead 37 once every ten time frames. In response to each reset pulse, the OR gate 31 produces a negative output pulse which is transmitted through normally closed contacts 1148 to inverter 51, which produces a positive output pulse on lead 43 to reset flip-flop 40. In addition, the reset pulse is forwarded to other line circuits through a multiple connection to reset the flip-flops included in the other line circuits. In response to the setting of flip-flop 40, relay 10 will be operated by the negative output potential on lead 42 and, as stated, the flip-flop 40 will be reset once every ten time frames. However, within one time frame, another set pulse will be applied on lead 41 to thereby set flip-flop 40 and maintain relay 10 operated. More specifically, since each time frame has a time duration of approximately one-hundred microseconds, the electromechanical relay 10 will not have time to release as the flip-flop 40 is periodically reset and set. The operation of ringing relay 10 opens contacts 11 and 13 and closes contacts 12 and 14 to shift the T and R leads from the calling bridge relay 1020 to the ring trip 20 through closed contacts 1143 and 1145 of the test control relay 1140. Thereafter, ringing current may be applied through transformer 70 to the T and R line conductors in the manner more fully described in the cited Jorgensen application. When relay 10 is to be operated to allow the application of ringing current to the line of line circuit 100 coincident time slot pulses will be applied to AND gate 32 from ringing store 90 and from the terminating line store 130. The output pulse from gate 32 will pass through OR gate 30 and inverter 50 to set flip-flop 40, all in the manner more fully described in the cited Jorgensen application.

In accordance with this invention, there is also provided a ring trip and test access circuit 1100 which is common to a plurality of line circuits. A convenient arrangement is to provide one ring trip and test access circuit 1100 for each group of ten line circuits wherein the group of ten line circuits have common tens and hundreds designations but different units designations. Since the ring trip and test access circuit 1100 is common to a plurality of line circuits, it will be noted that all the conductors from the circuit 1100 to the line circuit 100 are indicated as being multipled to other line circuits as required. The concurrent operation of test control relay 1140 and one of the ringing relays 10 from one of the line circuits will connect the T and R conductors from the line circuit having the operated ringing relay 10 to the testing position circuit 2200. More specifically, in response to the concurrent operation of the two relays, there will be completed a metallic connection from the T lead of the line circuit through operated contacts 12 and 1146 to the TT lead, and from the R lead of the line circuit through operated contacts 14 and 1144 to the TR lead. Because of the multiple connection from the conductors 1151 and 1152, it is desirable to prevent the operation of more than one ringing relay 10 in a given group of line circuits when the test control relay 1140 is operated. Another paragraph of this description will describe the means by which the operation of two ringing relays is inhibited when the test control relay is operated. The ring trip and test access circuit 1100 also includes a flip-flop 1160 which controls the operation of test control relay 1140 in the manner to be described below.

In addition to the aforementioned circuits, there is also provided a testing position circuit 2200 which is common to all the ring trip and test access circuits 1100 and, therefore, all the conductors from the testing position circuit are multipled. The testing position circuit 2200 includes a test control slave relay 2110, a line busy relay 2120 and a time delay relay 2130. Relay 2110 is operated whenever the test control relay 1140 in one of the ring trip and test access circuits 1100 operates. It will be shown that the line busy relay 2120 operates whenever the line to be tested is busy and, in response to the operation of relay 2120, the line busy lamp 2305 will be illuminated. The time delay relay 2130 provides a time delay to permit a determination of the busy or idle condition of the line to be tested prior to the operation of the ringing relay 10 in the line circuit to be tested. Test interrupt lamp 2304 will be automatically illuminated if it is necessary to interrupt the test in progress in order to permit a call to be completed to another line within the group including the line being tested.

In order to indicate which line is to be tested, the illustrated embodiment of the invention provides for use of a plurality of keys; three groups of ten each, one group each for the units, tens and hundreds designation. Of course, if desired, other means, such as a dial and a counting or register circuit, could be used to provide the signals in the required leads. Two keys from each group are illustrated. For example, keys 2101 and 2100 are the first and last keys of the ten different hundreds keys; keys 2011 and 2010 are the first and last keys of the ten different tens keys; and keys 2001 and 2000 are the first and last of the units keys. Operation of one of the hundreds keys places a potential marking on a selected one of the ten leads represented by the illustrated pair H1 and H10. In a similar manner, the operation of one of the tens keys places a potential marking on a selected one of the ten leads represented by the illustrated pair T1 and T10. Operation of one of the units keys will result in the placing of a signal on a selected one of the ten leads represented by the pair U1 and U10 and also on a selected one of the ten leads represented by the pair UB1 and UB10. Although the illustrated embodiment of this invention shows units, tens, and hundreds keys, it is, of course, obvious that the hundreds keys could be omitted or thousands keys added for smaller or larger systems, respectively.

When it is desired to test a particular line in the time division multiplex office, the testman will operate the appropriate units, tens and hundreds keys as well as the test control key 2301. The sequence of operating these keys is immaterial. For the purpose of this discussion, it will be assumed that the line designated 111 is to be tested and that, therefore, the operated units, tens and hundreds keys are 2001, 2011 and 2101, respectively. It will further be assumed that the units ONE lead, the tens ONE lead, and the hundreds ONE lead connect to the ring trip and test access circuit 1100 over the leads U, T and H. In response to the operation of the tens and hundreds keys, a negative potential will be applied to the T and H leads, thereby providing a partial enabling of AND gate 1180. The AND gate 1180 will receive a third enabling potential if all of the flip-flops in the ten line circuits having the same tens and hundreds designation as the line to be tested and corresponding to flip-flop 40 in line circuit 100, are in their reset state. As was shown above, reset pulses are applied once per ten time frames to lead 37 to reset the flip-flops 40. Therefore, unless one of the lines is being rung, all the flip-flops 40 will be in their reset condition. If all of the flip-flops are reset, or when they all become reset, a negative pulse will be passed through AND gate 1180 to inverter 1192 which will forward a positive pulse over lead 1163 to set flip-flop 1160. In response to the setting of flip-flop 1160, lead 1162 will be placed at a negative potential thereby operating test control relay 1140. In response to the operation of test control relay 1140, contacts 1149 will close to operate test control slave relay 2110 in the testing position circuit 2200. The operation of the units key 2001 applied a negative enabling signal over the UB1 lead to AND gate 1131. If the particular line that is to be tested is busy, a time slot pulse will be applied on lead 1155 thereby enabling AND gate 1131 and passing a negative pulse therethrough. In response to the busy indication signal passed through AND gate 1131, flip-flop 2240 will be set thereby operating line busy relay 2120. In response to the operation of line busy relay 2120, contacts 2121 will be closed to illuminate line busy lamp 2305 thereby advising the testman that line 111 is busy. As shown, reset pulses will be applied once every ten time frames to flip-flop 2240. However, as long as line 111 remains busy, a set pulse will be applied to flip-flop 2240 once each time frame and, therefore, the line busy relay 2120 will not release. That is, since the line busy relay 2120 is open circuited for a maximum of one hundred microseconds, it does not have time to release. The testman may either wait for the line to become idle, override the busy condition, or proceed to the testing of other lines. If he waits for the line to become idle, a reset pulse, as previously described, will reset flip-flop 2240 and, since a line is idle, no additional time slot pulses will be passed through AND gate 1131 and contacts 1141*a* to set flip-flop 2240 and, therefore, line busy relay 2120 will release. The release, or non-operation of line busy relay 2120 if the line had been idle, will provide an obvious circuit through contacts 2122 and 2111 to energize the slow-operate time delay relay 2130. Time delay relay 2130 is slow-operate in order to allow time for the line busy relay 2120 to operate when the line to be tested is busy. In response to the operation of relay 2130, a negative potential will be forwarded from operated contacts 2131 through the units key to the units lead to the ring trip and test access circuit, operated contacts 1141*b* of the test control relay 1140, and through OR gate 30. The negative signal passed through OR gate 30 is inverted by inverter 50 and sets flip-flop 40. It should be observed that only the flip-flop 40 in the particular line circuit whose line is to be tested was set. That is, the units ONE lead is connected to only one of the line circuits within this particular ten line group. In response to the setting of flip-flop 40, the ringing relay 10 will be operated. In response to the operation of ringing relay 10, the T and R leads of the line to be tested will be switched through operated contacts of the ringing relay 10 and the test control relay 1140 to the test TT and TR leads to the testing position circuit 2200 thereby providing the testman with direct metallic access to the T and R leads of the line to be tested. In response to the closure of contacts 1015 on relay 10, ground from contacts 1142 will be forwarded to operate the calling bridge relay 1020 of the line being tested. The operation of this relay closes contacts 1021 thereby providing off-hook supervision to the data gate 208 to mark this line as busy. With the line being tested now marked as busy, set signals will be applied to flip-flop 2240, as previously described. However, the operation of time delay relay 2130 opened contacts 2132, thereby preventing the operation of line busy relay 2120.

Inasmuch as the ring trip and test access circuit 1100 is common to ten line circuits, it is impossible to ring on any of the lines within the ten line group wherein one line is being tested until the test control relay is released. Therefore, if a connection is completed to one of the other line circuits, time slot signals from the terminating line store 130 and the ringing store 90 will enable the AND gate 32 in the line circuit which is to be rung. In response to the enabling of AND gate 32, a negative output pulse therefrom will pass through OR gate 30 and inverter 50 to set the flip-flop 40 associated with the line circuit that is to be rung. In addition, the negative output pulse of AND gate 32 will be forwarded through isolating gate 1154, OR gate 1171, and inverter 1191 to reset flip-flop 1160. In response to the resetting of flip-flop 1160, the energizing circuit of test control relay 1140 will be interrupted. In addition, the negative output pulse of AND gate 32 is forwarded through OR gate 1172 and operated contacts 1147 to reset flip-flop 40 in the line circuit whose line was being tested. After a few milliseconds, the electromechanical test control relay 1140 will release thereby reconnecting the ring trip circuit including relay 20 to the line requiring ringing. The release of test control relay 1140 closed contacts 1141 thereby forwarding a ground over the T1 lead to illuminate test interrupt lamp 2304 thereby advising the testman that his tests have been interrupted in order to permit ringing to one of the other nine lines within the group. After the ringing has been tripped, in the manner more fully described in the cited Jorgensen application, there will no longer be any time slot pulses applied to the AND gate 32 associated with the line that had been rung and, therefore, the flip-flop 40 associated with that line will ultimately be reset from one of the reset pulses applied to lead 37. Thus, when all of the flip-flops 40 within the ten line group are in their reset state, the third enabling potential will again be applied to AND gate 1180 thereby setting flip-flop 1160 and reoperating the test control relay 1140. In response to the reoperation of test control relay 1140, the test interrupt lamp 2304 is extinguished and all circuits are restored to the same condition they were in before the test was interrupted. Accordingly, the testman may continue with any desired tests.

Occasionally the testman will want to perform a test on a line which indicates busy. The testman may override the busy condition by momentary operation of the non-locking override busy key 2302 which completes a circuit to operate time delay relay 2130, and, therefore, after the operation of the override busy key 2302, the test connections will be completed in the manner described above.

When the testman has completed his series of tests, he can operate the non-locking test release key 2303 thereby applying a negative pulse through OR gate 1172 and operated contacts 1147 to reset flip-flop 40 associated with the line being tested. At the conclusion of the tests, all keys should be restored to their normal condition.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a communication system, a plurality of lines each adapted to originate and terminate communication connections, a signaling circuit common to a predetermined group of said lines, individual switching means associated with each of said lines comprising said predetermined group for selectively connecting its associated line with said signaling circuit, a testing circuit, control means in said testing circuit for providing a marking indicative of a selected one of the lines comprising said predetermined group of lines, enabling means coupled to said predetermined group of lines for providing an enabling signal when none of the lines in said predetermined group is coupled to said signaling circuit, and test access circuit means coupled to said testing circuit, said enabling means, and said predetermined group of lines for associating said testing circuit with the line indicated by the marking from said control means when said enabling means provides said enabling signal.

2. The combination as set forth in claim 1 wherein said enabling means includes means for disassociating said testing circuit from said selected line when one or more of the lines in said predetermined group is coupled to said signaling circuit.

3. The combination as set forth in claim 1 wherein said switching means and said test access circuit means includes means for inhibiting the extension of a communication connection to said selected line.

4. In a communication system, a testing position circuit including enabling means, a plurality of test access circuits coupled to said testing position circuit, a plurality of groups of communicating channels with all of the channels in a given group coupled to a given test access circuit, individual switching means associated with each of said channels for coupling the associated channel with the one of said test access circuits coupled thereto, control means included in said testing position circuit for selectively coupling said testing position circuit with a selected one of said test access circuits and with a selected one of said channels coupled to said selected test access circuit, an enabling signal source coupled to said channels, and means included in said selected test access circuit to couple an enabling signal from said source to said enabling means for enabling the coupling of said testing position circuit to said selected channel.

5. The combination as set forth in claim 4 wherein said control means includes means for coupling a selected one of said individual switching means to said selected test access circuit irrespective of whether or not said signal source provides an enabling signal.

6. The combination as set forth in claim 4 wherein said test access circuit includes means for inhibiting the channel associated with said selected switching means from becoming engaged in a communication connection.

7. The combination as set forth in claim 6 wherein said selected test access circuit includes means for decoupling the selected one of said channels from said selected test access circuit when the switching means associated with another channel couples its channel to said selected test access circuit.

8. In a telephone system serving a plurality of telephone lines, a ring trip and test access circuit common to a first group of said telephone lines, a ringing relay individual to each of said lines for connecting the associated line to said ring trip and test access circuit, a testing circuit, a test control relay in said ring trip and test access circuit for switching a line connected to said ring trip and test access circuit through to said testing circuit, means in said ring trip and test access circuit for inhibiting the operation of said test control relay when any of the lines in said first group of lines is connected to said ring trip and test access circuit, means for selectively operating a predetermined one of the ringing relays after the operation of said test control relay only when the line associated with said predetermined ringing relay is neither originating nor receiving a telephone connection, and means in said ring trip and test access circuit for releasing said test control relay when a telephone connection is extended to any of the other lines in said first group of lines.

9. The combination as set forth in claim 8 wherein said ringing relay and said test control relay include means for providing a busy signal in response to the conjoint operation of said relays.

10. The combination as set forth in claim 9 and including means in said testing circuit for indicating when said test control relay is released in response to the extension of a telephone connection to any of said other lines in said first group of lines.

No references cited.

ROBERT H. ROSE, *Primary Examiner.*

H. W. GARNER, F. N. CARTEN, *Assistant Examiners.*